(12) United States Patent
Laisement et al.

(10) Patent No.: US 8,262,312 B2
(45) Date of Patent: Sep. 11, 2012

(54) SYSTEM FOR LOCKING A FIRST SHAFT WITH RESPECT TO A SECOND SHAFT ELIMINATING CLEARANCES BETWEEN SAID SHAFTS

(75) Inventors: André Laisement, La Chapelle Encherie (FR); Vincent Emery, Saint Amand Longpre (FR); Pascal Millet, Vendome (FR)

(73) Assignee: ZF Systemes de Direction Nacam SAS, Vendome (FR)

( * ) Notice: Subject to any disclaimer, the term of this patent is extended or adjusted under 35 U.S.C. 154(b) by 542 days.

(21) Appl. No.: 12/227,311

(22) PCT Filed: May 16, 2007

(86) PCT No.: PCT/FR2007/051292
§ 371 (c)(1),
(2), (4) Date: Feb. 23, 2009

(87) PCT Pub. No.: WO2007/132133
PCT Pub. Date: Nov. 22, 2007

(65) Prior Publication Data
US 2009/0148230 A1    Jun. 11, 2009

(30) Foreign Application Priority Data
May 17, 2006    (FR) ...................................... 06 04434

(51) Int. Cl.
*B25G 3/12*    (2006.01)
(52) U.S. Cl. ...................... 403/379.4; 403/316; 403/326; 403/361

(58) Field of Classification Search .................. 464/182, 464/DIG. 901; 403/109.2, 109.3, 109.6, 403/316, 317, 325, 327, 341, 361, 379.1, 403/379.2, 379.4, 318
See application file for complete search history.

(56) References Cited

U.S. PATENT DOCUMENTS

| | | | | |
|---|---|---|---|---|
| 3,926,532 A | * | 12/1975 | Schlenker et al. | 403/322.2 |
| 4,283,158 A | * | 8/1981 | Takahata | 403/322.2 |
| 4,639,162 A | * | 1/1987 | Geisthoff et al. | 403/316 |
| 4,645,372 A | * | 2/1987 | Suzuki | 403/325 |
| 4,859,110 A | * | 8/1989 | Dommel | 403/325 |
| 4,927,286 A | * | 5/1990 | Hobluigie et al. | 403/322.2 |
| 5,106,224 A | * | 4/1992 | van Gelderen | 403/315 |
| 5,785,448 A | * | 7/1998 | Courgeon et al. | 403/325 |
| 6,254,303 B1 | * | 7/2001 | Falat et al. | 403/348 |
| 6,840,705 B2 | * | 1/2005 | Rager | 403/325 |
| 7,661,725 B2 | * | 2/2010 | Kouda | 285/316 |

FOREIGN PATENT DOCUMENTS
FR    2 618 501 A1    1/1989
* cited by examiner

*Primary Examiner* — Joshua Kennedy
(74) *Attorney, Agent, or Firm* — Arent Fox LLP

(57) ABSTRACT

A system for locking, with respect to rotation and translation, the engagement of a first shaft with a second shaft, the first shaft being disposed in an axial bore in the second shaft. The system includes a locking device movable between a locking position and a release position, the first shaft having an end part which includes two walls inclined towards each other in a transverse direction, the axial bore having two corresponding walls opposite the inclined walls of the first shaft wherein changing the locking position of the locking device causes a transverse movement of the end part which puts the inclined walls of the first shaft in abutment against the corresponding walls of the axial bore.

8 Claims, 5 Drawing Sheets

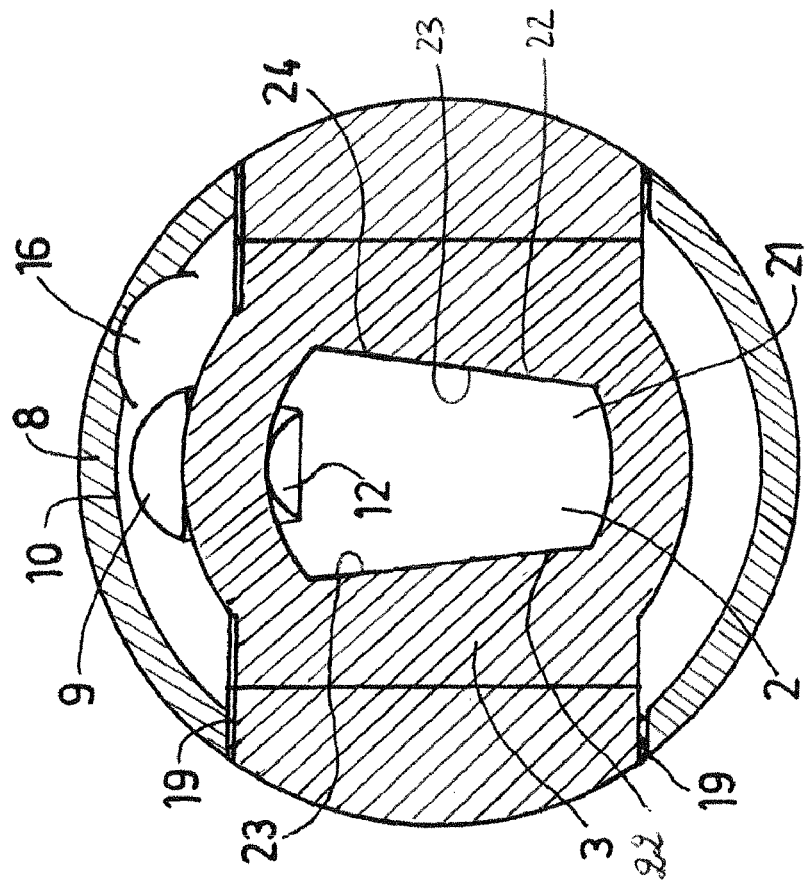
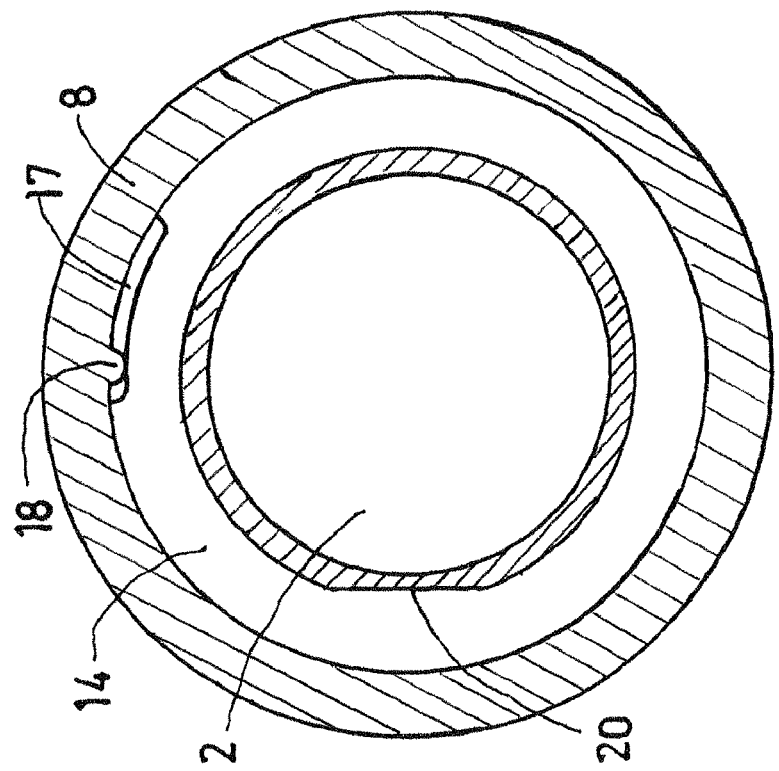
FIG.3
FIG.2

SYSTEM FOR LOCKING A FIRST SHAFT WITH RESPECT TO A SECOND SHAFT ELIMINATING CLEARANCES BETWEEN SAID SHAFTS

CROSS-REFERENCE TO RELATED APPLICATION

This application is a National Stage entry of International Application No. PCT/FR2007/051292, filed May 16, 2007, the disclosure of the prior application is hereby incorporated in its entirety by reference.

The invention relates to a system for locking, with respect to rotation and translation, the engagement of a first shaft with a second shaft, as well as the utilisation of such a system for the connection of a steering column to the pinion of a rack of a motor vehicle, and for the connection of a steering wheel hub to a steering column shaft in the motor vehicle.

Systems for locking, with respect to rotation and translation, a first shaft and a second shaft are known in order to transmit the efforts from one shaft to the other shaft by engaging them in rotation and in translation. The document FR-2-618 501, for example, describes such a system.

The system described in this document makes it possible to provide the locking of the first shaft on the other shaft without any clamping means requiring particular tools. Such a system is particularly advantageous for shafts, the junction of which is little accessible for positioning such tools and tightening the clamping means in a sufficient way to guarantee a correct transmission of the efforts of the shafts to each other. This accessibility issue is particularly acute for the connection of a steering column to the pinion of the rack in a motor vehicle. As a matter of fact, the connection point for these elements is positioned close to the pedals, the pedal support, the front body panel and the front body panel joint in the motor vehicle, thus causing problems to reach a tightening screw with a screwing machine.

In addition, the systems known do not make it possible to eliminate the clearances between the first and the second shaft, for example between the pinion of the rack and the steering column. Now, the elimination of such clearances is most important to guarantee an optimal transmission of efforts between the first shaft and the second shaft. In the case of the steering column, it is important that the movements of the steering wheels are correctly transmitted to the pinion of the rack without any feeling of play for the driver. The elimination of the clearances is not optimum with the known connection systems without tightening tools.

The object of the invention is to remedy this drawback by providing a system for locking, with respect to rotation and translation, the engagement of a first shaft and a second shaft, wherein the clearance between the shafts is optimally eliminated when the system is in the locking position, such system requiring no tightening to provide the locking.

For this purpose and according to a first aspect, the invention relates to a system for locking, with respect to rotation and translation, the engagement of a first shaft with a second shaft, said first shaft being substantially coaxial with the second shaft, one part of said first shaft being provided in an axial bore of said second shaft, said system comprising a locking device movable between a locking position, wherein the first shaft is integral in rotation and in translation with the second shaft, and a release position, wherein the first shaft is not engaged with the first shaft, the first shaft having an end part comprising two walls inclined towards each other along a transverse direction, the axial bore comprising two corresponding walls extending in the same direction as the inclined walls of the first shaft opposite these, the change to the locking position of the locking device causing a transverse movement of the end part of the first shaft, so as to put the inclined walls of said end part in abutment against the corresponding walls of the axial bore, so as to substantially eliminate the clearance between the first and the second shaft in the locking position.

Thus, the first shaft is introduced into the second shaft with some clearance prior to the locking of such shafts with respect to each other. The change to the locking position of the locking device causes the movement of the end part of the first shaft against the corresponding walls of the second shaft, which makes it possible to completely lock the first shaft with respect to the second shaft, and to eliminate the clearances between such shafts. Then, the efforts are optimally transmitted between both shafts.

The first shaft may have a zone having a substantially tapered shape in the axial direction, said zone being positioned opposite the free edge of the axial bore, said edge having a shape substantially matching that of the tapered zone, the change to the locking position of the locking device causing an axial movement of the tapered zone against the edge of the bore, such movement causing the transverse movement of the end part of the first shaft.

The abutment of the tapered zone against the edge of the bore thus enables the transverse movement of the end part of the first shaft. In addition, the tapered zone of the first shaft enables a guiding of the end part of such shaft in the bore of the second shaft, when the first shaft is introduced into such bore.

According to one embodiment, the first shaft includes at least one housing, the second shaft including at least one orifice positioned opposite said housing in the locking position, the locking device comprising a control member movable in axial translation between the release position and the locking position, as well as the locking member actuated in radial translation by the ring between a release position, wherein the locking member is positioned out of the housing and a locking position, wherein the locking member goes through the orifice of the second shaft and is positioned in the housing, so as to lock the first shaft with respect to the second shaft.

According to another embodiment, the control member is a slide accommodated in a bore of the first shaft. The slide can be provided with a transverse bore for guiding a transversely movable triggering lock engaged in a hole of the shaft for locking the slide in the release position, the triggering lock being, in addition, engaged with the second shaft for releasing the slide.

According to a second aspect, the invention relates to the utilisation of a locking system such as described hereabove for the connection of a steering column to the pinion of a rack of a motor vehicle, the first shaft being formed by said pinion of the rack, the second shaft being formed by jaws including means of association with the steering column.

According to a third embodiment, the invention relates to the connection of the steering wheel hub to the steering shaft, the first shaft being formed by the steering shaft, the second shaft being formed by the steering wheel hub.

Other aspects and advantages of the invention will appear upon reading the following description, while referring to the appending figures.

FIG. 2 is a schematic representation in transversal cross-section of the system along the axis II-II of FIG. 1.

FIG. 3 is a schematic cross-sectional representation of the system along the axis III-III of FIG. 1.

In the description, the word "axial" is defined according to the direction in which the first and the second shafts extend, the word "transverse" is defined with respect to the plan perpendicular to the axial direction.

Figure 1:
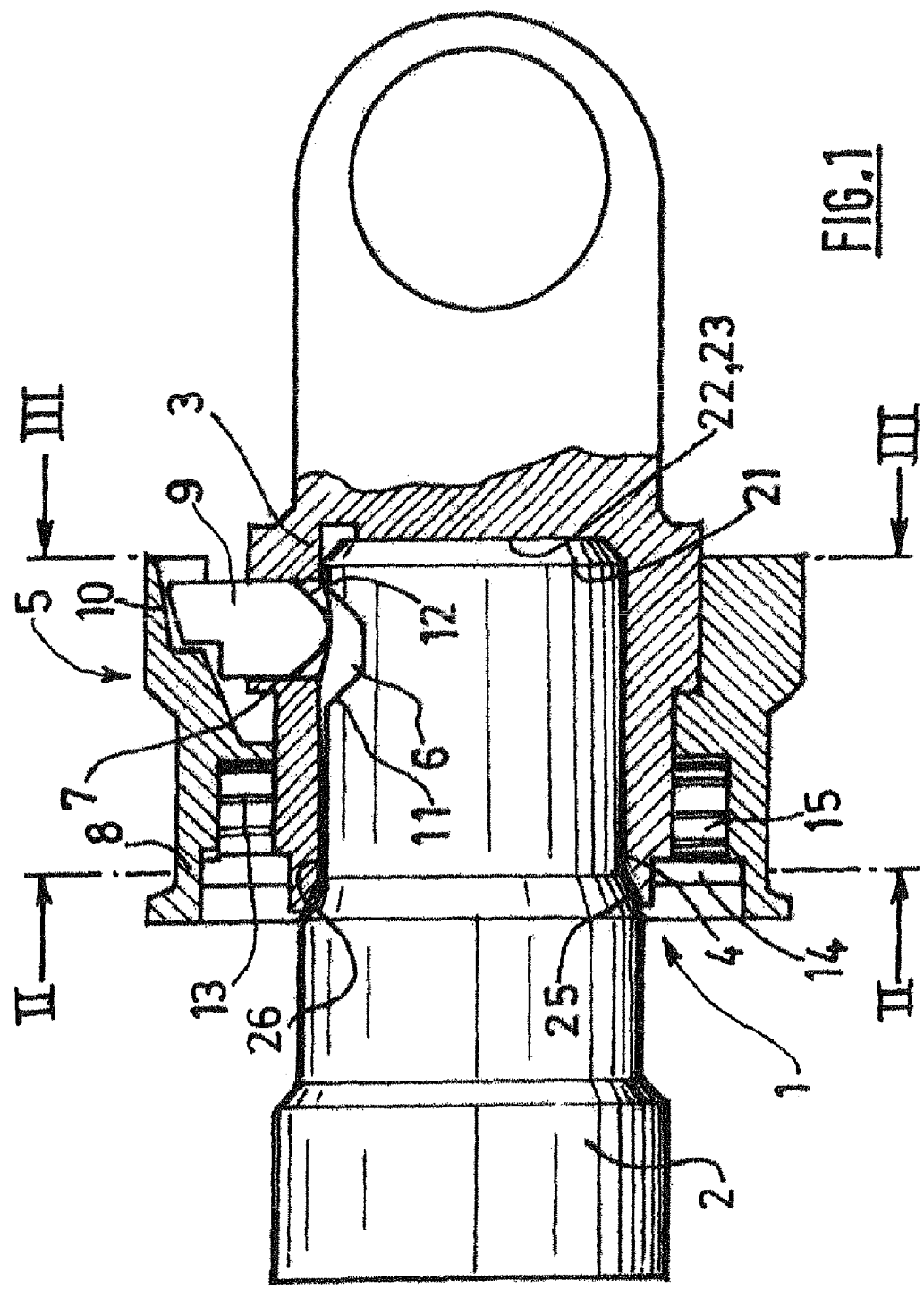
FIG. 1 is a schematic representation in axial cross-section of a locking system according to the invention.

While referring to FIG. 1, a system 1 for locking, with respect to rotation and translation, the engagement of a first shaft 2 with a second shaft 3 is described. The first shaft 2 is substantially coaxial with the second shaft 3 and a part of the first shaft 2 is positioned in an axial bore 4 of the second shaft 3.

The locking system 1 includes a locking device 5 movable between a locking position, wherein the first shaft 2 is integral, with respect to rotation and translation, with the second shaft 3, and a release position, wherein the first shaft 2 is not engaged with the second shaft 3.

According to the embodiment shown in FIGS. 1 to 3, the locking system 5 includes at least one housing 6 provided in the first shaft 2, at least one orifice 7 provided in the second shaft 3 and positioned opposite the housing 6 in the locking position. The locking device 5 further comprises a control member composed of a ring 8 positioned about the first and the second shafts 2 and 3, movable in axial translation between the release position and the locking position, and the locking member 9 actuated in transverse translation by the ring 8 between a release position, wherein the locking member 9 is positioned out of the housing 6 (FIG. 1), and a locking position, wherein the member 9 goes through the orifice 7 of the second shaft 3 and is positioned in the housing 6 so as to lock the first shaft 2 with respect to the second shaft 3 (FIG. 3).

In order to enable the actuating in transverse translation of the locking member 9, the ring 8 has an inner wall 10 having a substantially tapered shape, said wall being in abutment against the locking member 9, as shown in FIG. 1. Thus, the movement in axial translation of the ring 8 causes a reduction in the diameter of the inner wall opposite the locking member 9, which causes the transverse translation movement of the locking member 9 upon the changing from the release position to the locking position.

The locking member 9 may be a nipple or a ball. According to the embodiment shown in the Figures, the member 9 comprises a wall having a shape substantially matching the inner wall 10 of the ring 8. The housing 6 of the first shaft 2 has two walls 11 inclined so as to have a flared shape enabling the guiding of the locking member 9 towards the bottom of the housing 6, upon the change to the locking position. For this purpose, the locking member 9 may include a wall 12 having a shape substantially matching one of the walls 11 of the housing 6. According to various embodiments, the locking member 9 may be oriented substantially perpendicularly to the first and the second shafts or may form an angle with respect to this perpendicular direction. The angle is for example between 20° and 30°.

A spring 13 is positioned between the ring 8 and an abutment surface 14, integral with the second shaft 3 and extending substantially transversely. The spring 13 is so arranged as to push the ring 8 towards the locking position thereof, with the change to the release position compressing the spring 13. The spring 13 is, for example, introduced into a bore 15 of the ring 8 provided about the second shaft 3 and bears against a transverse wall of the ring forming an edge of the bore 15. Once the spring 13 is introduced in the bore 15, the abutment surface 14 can be crimped about the second shaft 3. The travel in axial translation of the ring is for example substantially equal to 2.5 mm.

The ring 8 is movable in rotation along a determined range in the release position, a spacing 16 being provided in the inner wall 10 as shown in FIG. 3. This spacing is opposite the locking member 9 when the ring 8 has rotated on a predetermined range, so that the inner wall 10 is no longer in abutment against the locking member 9 and the latter can change from the locking position to the release position when the first shaft 2 is taken out of the bore 4.

For this purpose, the abutment surface 14 has a hole 17 the width of which defines the rotation range of the ring 8. The ring 8 has a stop 18 introduced into the hole 17 when the ring 8 is in the release position, so as to stop the rotation of the ring 8 when the stop 18 reaches an edge of the hole 17 as shown in FIG. 2. According to one embodiment, the hole 17 has a width so arranged that the ring can be rotated by about 25° between the locking position and the release position.

The ring 8 is provided with stops 19 bearing against the second shaft 3 when the ring 8 is in the locking position so as to prevent the rotation of the ring in the locking position.

In order to correctly position the hole 17 with respect to the ring 8 and to the stop 18, a position locator 20 can be provided on the second shaft 3 and on the abutment surface 14, as shown in FIG. 2.

In order to change the locking system to the release position, the ring 8 is axially translated to the release position against the effort of the spring 13, so as to release the stops 19. Then, the ring 8 is rotated so as to position the spacing 16 opposite the locking member. In this position, the first shaft 2 can be disengaged from the bore 4 which causes the locking member 9 to change to the release position.

A simple rotation of the ring 8 places the locking member 9 against the inner wall 10 of the ring 8 and makes it possible to change the system to the locking position when the first shaft 2 is introduced into the bore 4, as it is pushed by the spring 13.

Figure 4:
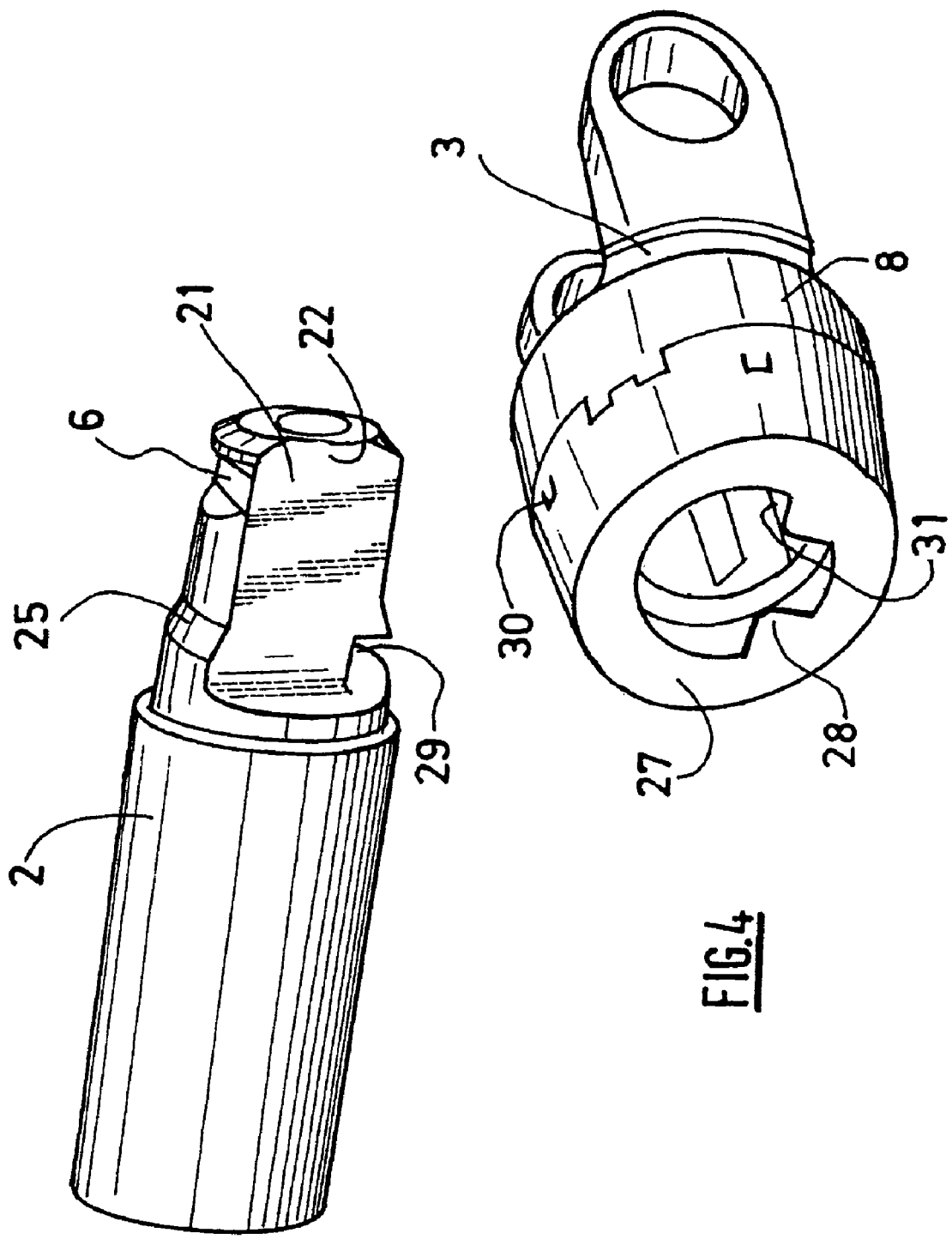
FIG. 4 is a schematic representation in exploded perspective of a variation of the system of FIG. 1.

However, when the inner wall 10 is bearing against the locking member 9 in order to change to the locking position, the second shaft 3 must be correctly positioned with respect to the first shaft 2 in order not to be disengaged. The assembling of the system is blind, so according to an embodiment shown in FIG. 4, the utilisation of a guard ring 27 is provided which makes it possible to check that the change to the locking position can be obtained only if the shafts are correctly positioned with respect to each other. The guard ring 27 is positioned about the first shaft 2 and is integral, with respect to rotation, with the ring 8 through at least one pin 30 integral with the ring 27 and introduced into a matching groove provided on the ring 8. The guard ring 27 comprises at least one recess 28 protruding towards the inside of an orifice 31 for the passage of the first shaft 2 in the ring 27. The first shaft 2 is provided with a groove 29 which is positioned opposite the recess 28 when the shafts 2 and 3 are correctly positioned with respect to each other. Thus, when the shafts are correctly positioned, the recess 28 can engage into the groove 29 upon the rotation of the ring 8. Reversely, if the shafts 2 and 3 are not correctly positioned with respect to each other, i.e. if the recess is not positioned opposite the groove 29, the rotation of the ring 8 is prevented, since the recess 28 is in abutment against the first shaft 2 so that the inner wall 10 of the ring 8 cannot be put in abutment against the locking member 9. Then, it is guaranteed that the change to the locking position cannot be obtained but if the shafts 2 and 3 are correctly positioned with respect to each other.

Now, the way the invention enables the elimination of all the clearances between the first and the second shafts 2 and 3 upon the change of the locking system 1 to the locking position will be described while referring to FIGS. 1 and 3.

At least the end part 21 of the first shaft 2, extending beyond the housing 6, includes two walls 22 inclined towards each other according to a transverse direction as shown in FIG. 3. Thus, the end part 21 of the first shaft 2 has a section having a substantially trapezoidal shape. The axial bore 4 includes two matching walls 23 extending in the same direction as the inclined walls 22, opposite these. In addition, the bore 4 includes a space 24 making it possible to introduce the first shaft 2 into the bore 4 with some clearance. When the first shaft 2 has been introduced with the clearance into the bore 4, the change to the locking position of the locking device 5 causes a transverse movement of the end part 21 of the first shaft 2 in order to put the inclined wall 22 in abutment against the corresponding walls 23, so as to substantially eliminate the clearance between the first and the second shafts in the locking position.

For this purpose, the first shaft 2 further has a zone 25 having a substantially tapered shape in the axial direction, as shown in FIG. 1. This zone 25 is positioned opposite the free edge 26 of the axial bore 4 when the shaft 2 is introduced into the bore 4. This edge 26 has a shape substantially matching the tapered zone 25 so that the change to the locking position of the locking device 5 causes an axial movement of the tapered zone 25 against the edge 26 of the bore 4, with this movement causing the transverse movement of the end part 21 of the first shaft 2. As a matter of fact, according to the embodiment shown in the Figures, when the locking member 9 goes into the housing 6, it causes the axial movement of the shaft 2 towards the bottom of the bore 4 which places the tapered zone 25 against the edge 26 which causes, in turn, the transverse movement of the end part 21 of the shaft 2. Then, all the clearances between the first and the second shafts 2 and 3 are eliminated.

In addition, the tapered zone 25 enables the guiding of the end part 21 in the bore 4.

The locking system 1 described hereabove can be applied more particularly to the connection of a steering column to the pinion of the rack in a motor vehicle, the first shaft being formed by said pinion of the rack, and the second shaft being formed by cardan jaws including means for the connection to the steering column.

A second embodiment of the invention will now be described while referring to the FIGS. 5 to 8, the elements identical or similar to the elements of the first embodiment having identical reference numbers, whenever possible.

The locking system 1 makes it possible to lock, with respect to translation and to rotation, a first hollow shaft composing the steering column shaft 2 with a second hollow shaft composed by a steering wheel hub 3. The first shaft 2 defines a geometric axis having the reference Z. One end 21 of the shaft 2 is provided with two plane outer walls 22 parallel to the axis Z and inclined towards each other, and connected to one another by cylinder sector walls 22A, 22B so that the end 21 has a substantially trapezoidal transverse section. In addition, the shaft 2 has a bore 15 closed by a plate 14 forming a stop. In this bore 15, a control member composed of a slide 8 is received, which is movable in translation in the bore 15 along the axis Z but which is fixed in rotation, and it is pushed in the axial direction opposite the plate 14 by a slide spring 13.

The control slide 8 is provided with a thrust slope 10 and a side bore 30. The slope 10 cooperates with the locking element 9 which is, here, a ball guided in a guiding hole 7 provided in the wall. The side bore 30 is a positioning hole 33 provided in the wall 22A and having a first larger opening part 33A and a second smaller opening part 33B. In the side bore 30 is placed a triggering lock composed by a push button 31 provided with a large diameter guiding cylinder 31A, a bearing shoulder 31B and a smaller diameter nipple 31C protruding through the hole 33. The triggering lock 31 is guided by the walls of the side bore 30 in translation along a geometric axis X perpendicular to the axis Z. A return spring 32 pushes the push button 31 towards the hole 33. The shaft 2 is extended opposite the axial bore 15 by a tubular part having a larger section and has a driving tapered wall 25 at the level of the section change.

The hub 3 is provided with a bore having opposite plane side walls 23 inclined towards each other, and positioned with respect to each other in the same way as the inclined walls 22. The plane walls 23 of the bore are connected to each other by two release walls 23A, 23B. The wall 23B is provided with a locking slope 11. The wall 23A is provided with a ridge 34. It should be noted that the distance between the walls 23A, 23B is bigger than the distance between the walls 22A, 22B so that a release volume 24 exists close to the wall 23B. The mouth of the hub 3 includes a tapered chamfer 26.

The device is actuated as follows. In the released state of the device 1, i.e. prior to the mounting of the steering wheel hub 3 on the shaft 2, the shoulder 31B of the triggering lock 31 is engaged with the large section part 33A of the positioning hole 33 and returned to this position by the return spring 13. The triggering lock 31 then holds the slide 8 in a position close to the plate 14, with the spring 13 being stretched. The nipple 31C protrudes through the positioning hole 33 beyond the outer face of the wall 22. The wall 9 finds a free volume where it can be accommodated close to the push slope 10.

Figure 5:
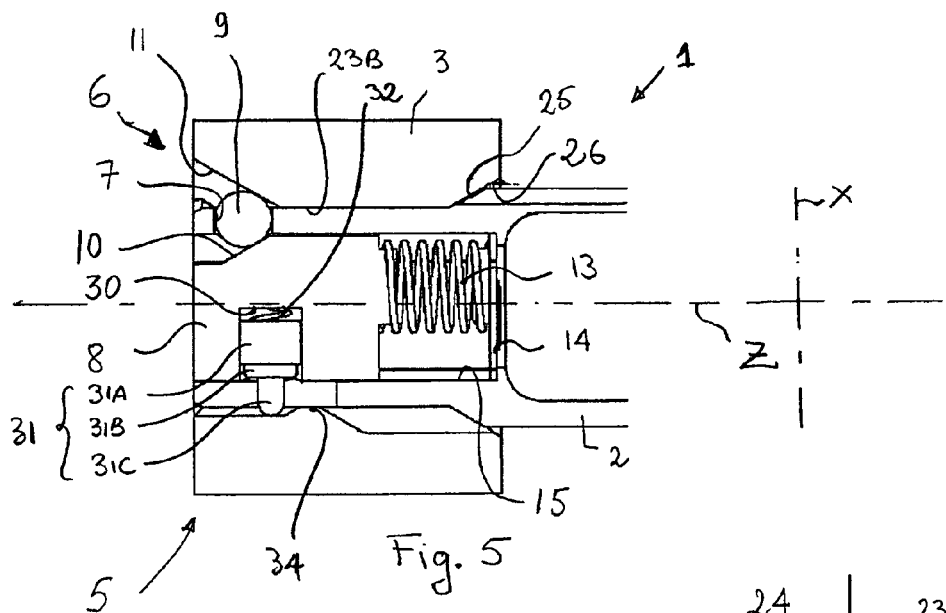
FIG. 5 is a schematic representation in axial cross-section of a locking system according to a second embodiment of the invention.
Figure 7:
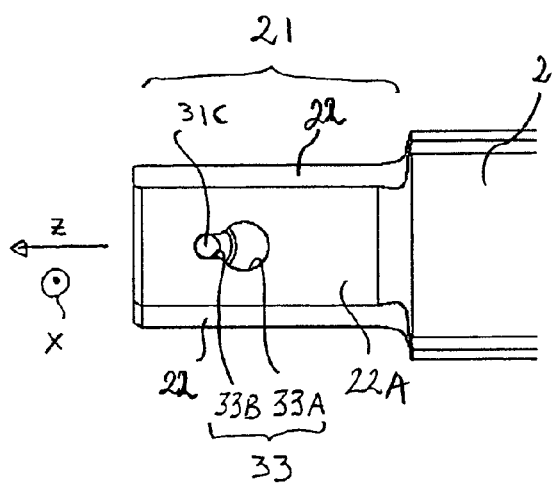
FIG. 7 illustrates a detail of the system of FIG. 5.
Figure 6:
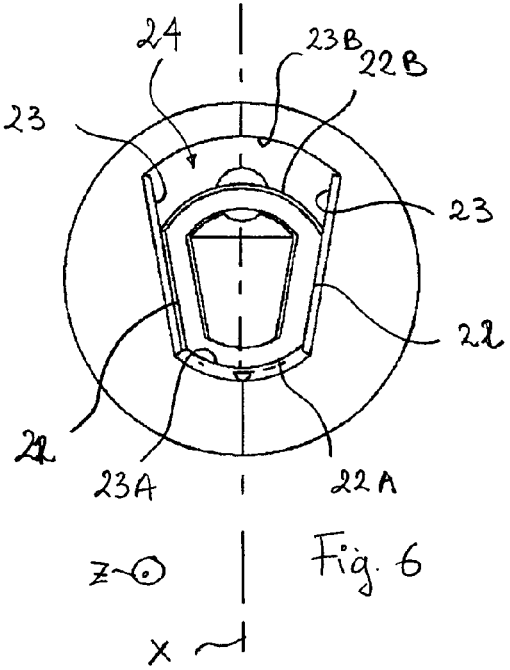
FIG. 6 is a side view of the system of FIG. 5.

Then, the hollow shaft 2 can be introduced into the hub 3 on the steering wheel through a translation movement along the axis Z. At the beginning of the insertion, the shaft and the hub have a degree of freedom with respect to each other according to the axis X since the shaft is partially in the release volume 24. When further inserting the shaft along the axis Z, the nipple 31C meets the ridge 34 so that the triggering lock 31 progressively goes into the bore 30. As soon as the shoulder 31B is released from the larger diameter part 33A of the positioning hole, the slide 8 is free to move in translation along the axis Z and is pushed by the locking spring 13 in the locking position, as shown in FIG. 5. The ball 9 is then partially pushed out of the hole 7 by the push slope 10 and comes into contact with the locking slope 11. When the insertion of the shaft 2 in the hub 3 is continued, the tapered wall 25 meets the chamfer 26. The inclination of the tapered wall and the chamfer results in the shaft also being pushed in the direction X, so that the walls 22 and 23 are positioned against one another. This movement is assisted by the locking spring 13 pushing on the slide 8 which entails the pushing of the ball 9 on the locking slope 11, with a component in the direction of the axis X which tends to place the walls 22 closer to the walls 23. When the final position of FIG. 5 is reached, the static effort exerted by the spring results in a contact pressure between the walls 22 and 23 and in a contact pressure between the tapered wall 25 and the chamfer 26. The triggering lock 31 is positioned in the narrow part 33B of the hole and the nipple thereof 31C bears against the wall 23A, beyond the ridge 34 and in a position which guarantees the positioning of the elements on the device if the spring 13 fails.

It is also possible to combine the connecting mechanism of the invention with an electric connection device between the two shafts, with one of the two shafts being provided with a male electric connector provided with one or several connection beams protruding axially and the other shaft being provided with a female electric connector matching the male connect which enables the insertion of the beams either upon the axial insertion initial movement along the direction Z, or during the relative movement of the shaft in the transverse direction X. According to an alternative embodiment not shown, at least one of the connectors belongs to an electrical connection device between rotating parts. This alternative is particularly interesting in the application of the invention to the connection between a steering wheel and a steering shaft. In this application, the rotating electric connection device is fixed to the steering shaft, then the steering wheel hub is mounted as the steering shaft according to the invention by an axial insertion movement of the shaft into the hub as previously described, followed with a transverse connection movement in the direction X. These movements simultaneously provide the electric connection between the connector fixed on the steering wheel and the connector belonging to the rotating electric connection. In a subsequent phase of the mounting on the steering column, the shaft is mounted on the vehicle and the rotating electric connection device is connected to the electric circuit of the vehicle, thus providing the electric connection of the electric elements provided on the steering wheel and the electric circuit of the vehicle.

Figure 8:
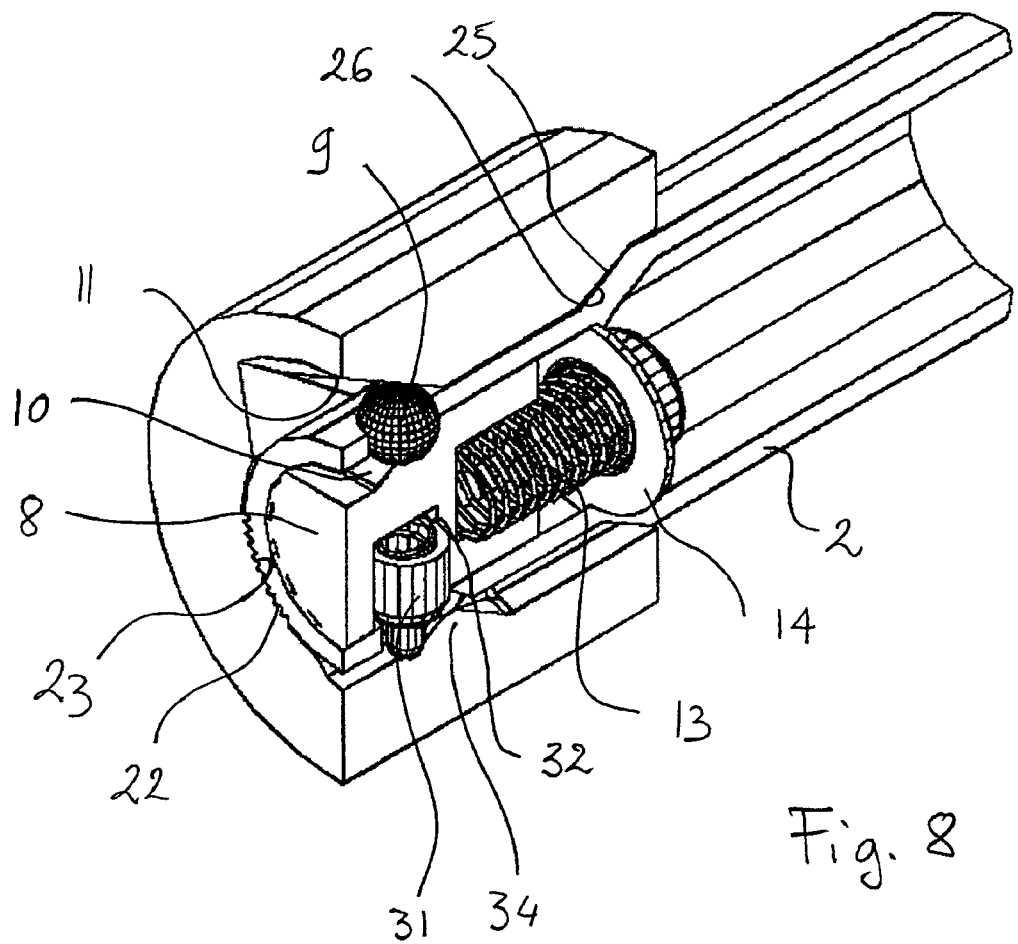
FIG. 8 is a perspective representation of a locking system according to a third embodiment of the invention.

Of course, various modifications are possible. The walls 22 and 23 are not necessarily plane, the important fact being that they have a matching shape allowing the stacking when the shaft 2 is moved in the direction X. As an illustration, FIG. 8 shows an alternative of the second embodiment of the invention with the same reference numbers being mentioned for referring to identical or similar parts. This alternative solution is different from the system of FIGS. 5 to 7 mainly as regards the shape of the matching walls 22 and 23 which are provided by ribs 22 on a lower part of the end 21 of the shaft 22 and matching ribs 23 in the inner wall of the hub 3. Of course, such ribs are provided so as to allow the transverse insertion of the ribs 22 into the ribs 23 along the axis X.

Other modifications are possible. More particularly, it is possible to combine elements of the various embodiments of the invention. In addition, the device according to the first embodiment may be used for connecting a steering shaft to the steering wheel and the device according to a second embodiment for connecting a steering shaft to steering cardan jaws. It is also possible to use the system of the invention for connecting two segments of a steering shaft together. The word "shaft" is generally used in the application for referring to an element intended to rotate about a geometric rotation axis.

The invention claimed is:

1. A system for locking, with respect to rotation and translation, a first shaft with a second shaft, said first shaft being substantially coaxial with a second shaft, a part of said first shaft being disposed in an axial bore in said second shaft, said system comprising a locking device movable between a locking position, wherein the first shaft is integral, with respect to rotation and translation, with the second shaft, and a release position wherein the first shaft is not engaged with the second shaft, said system being characterised in that the first shaft has an end part comprising two walls inclined towards each other in a transverse direction, the axial bore comprising two corresponding walls extending in the same direction as the inclined wall of the first shaft opposite these, the change to the locking position of the locking device causing a transverse movement of the end part of the first shaft so as to put the inclined walls of said end part in abutment against the corresponding walls of the axial bore in order to substantially eliminate the clearance between the first and the second shaft in the locking position, said first shaft comprises at least one housing, the second shaft comprising at least one orifice positioned opposite said housing in the locking position, the locking device comprising a control member movable in axial translation between the release position and the locking position, and a locking member actuated in transverse translation by the control member between a release position wherein the locking member is positioned out of the housing, and a locking position wherein the member goes through the orifice of the second shaft and is positioned in the housing, so as to lock the first shaft with respect to the second shaft, the control member has an inner wall forming a slope, said slope bearing against the locking member so that the axial translation movement of the control member causes the transverse translation movement of the locking member upon the changing from the release position to the locking position, the control member is a ring positioned around the first and the second shafts, the ring is movable in rotation according to a determined range in the release position, with a spacing being provided in the inner wall, said spacing being opposite the locking member when the ring has rotated on said range, so that the inner wall no longer bears on the locking member and that the latter can change from the locking position to the release position thereof, and wherein an abutment surface is provided integral with the second shaft and has a hole the width of which defines the rotation range of the ring, said ring having a stop introduced into said hole when the ring is in the release position, so as to stop the rotation of said ring when the stop reaches an edge of the hole.

2. A locking system according to claim 1, wherein the first shaft has a zone having a substantially tapered shape in the axial direction, said zone being positioned opposite a free edge of the axial bore, said edge having a shape substantially matching the tapered zone, the change from the locking position of the locking device causing an axial movement of the tapered zone against the edge of the bore, such movement causing the transverse movement of the end part on the first shaft.

3. A locking system according to claim 1, wherein a spring is positioned between the control member and an abutment surface integral with the second shaft, said spring being so arranged as to push the control member towards the locking position thereof, the change to the release position compressing said spring.

4. A locking system according to claim 1, wherein the locking device comprises a guard ring integral with the ring with respect to rotation, said guard ring surrounding the first shaft and comprising at least one projection, the first shaft being provided with a groove wherein said projection can engage, said guard ring preventing the rotation of the ring if the at least one projection is not positioned opposite the groove.

5. A locking system according to claim 1, wherein the ring is provided with stops bearing against the second shaft when the ring is in the locking position, so as to prevent the rotation of said ring in the locking position.

6. A locking system according to claim 1, wherein the housing of the first shaft has two walls inclined so as to have a flared shape allowing the guiding of the locking member towards the bottom of the housing upon the change to the locking position.

7. The system according to claim 1, wherein the first shaft is formed by a pinion of a rack of a steering column of a motor vehicle, and the second shaft is formed by a jaw comprising means for matching with the rack and pinion of the steering column.

8. The system according to claim 1, wherein the first shaft is formed by a steering shaft of a motor vehicle, and the second shaft is formed by a steering wheel hub.

* * * * *